Jan. 2, 1968     A. COLE III     3,361,412

FOAM MIXING HEAD

Filed May 6, 1964

INVENTOR.
AUSTIN COLE III
BY Elliott & Pastoriza
ATTORNEYS 3,361,412
FOAM MIXING HEAD
Austin Cole III, 141 N. Walnut,
Danville, Ill. 61832
Filed May 6, 1964, Ser. No. 365,322
4 Claims. (Cl. 259—4)

This invention relates generally to foam mixing heads and more particularly to an improved static type mixing head for generating polyurethane foam.

In my co-pending patent application Ser. No. 264,419 filed Mar. 11, 1963, and entitled, Portable Foaming Apparatus, now abandoned, there are disclosed first and second sources of foam ingredients together with flow control means and a "gun" or static head structure for mixing the ingredients to provide a polyurethane foam. The present invention relates to an improved static head structure or "gun" which may be used with the system described and claimed in the aforementioned pending patent application.

Heretofore, mixing heads usually employed a mechanical agitator to insure mixing of the foam ingredients to provide a proper foam. In these prior art mixing heads, the major portion of the expansion of the foam takes place after the ingredients leave the mixing head. Thus, when the foam is directed into a mold or between forms defining a wall, the major expansion occurs in the mold or between the forms with the consequence that it is difficult to control the density and mix of the finished foam. Further, considerable waste can result as a consequence of lack of control over the expansion and any gaseous expanding agent used in the foam ingredients.

In other prior art devices, rather than a mechanical type agitation, a compressed gas such as compressed air has been introduced to cause a "fluffing" of the foam ingredients within a mixing chamber. These systems thus require an auxiliary source for the compressed air as well as an additional inlet and control valve therefor to the mixing chamber. Further, the major expansion of the foam still takes place exterior of the "gun" structure with the attendant disadvantage mentioned above.

A further characteristic of all prior art mixing heads is the fact that the two major foam components or streams are split and reunited several times in the mixing head and caused to issue through multiple outlets from the mixing chamber. It is found that the quality of the generated foam resulting from this type of mixing is not always satisfactory.

With the foregoing in mind, it is a primary object of this invention to provide a greatly improved static mixing head for providing polyurethane foam in which the foregoing disadvantages are overcome.

More particularly, it is an object to provide an improved mixing head in which no mechanical agitation or auxiliary source of compressed gas is necessary to effect the desired mixing.

Another important object is to provide an improved mixing head in which the major portion of expansion of the foam takes place before the foam issues from the outlet structure of the head to the end that cell size and thus density may be more carefully controlled and to the further end that waste is minimized.

A particular object of this invention is to provide an improved mixing head suitable for use with the particular foam ingredients described in my afore-mentioned co-pending patent application.

A further very important object of this invention is to provide an improved static mixing head in which there is defined only a single outlet flow path so that at no time is the stream of the two components split and then reunited, to the end that improved quality foam is guaranteed.

Still another important object is to provide an improved static mixing head which is easy to clean.

Briefly, these and many other objects and advantages of this invention are attained by providing a body member having a central chamber. Suitable first and second inlet means together with valve controls communicate with the chamber and serve to introduce first and second foam components to be mixed together.

Cooperating with the chamber is an elongated outlet structure including a single passage means. This passage means incorporates a baffle structure to cause foam from the chamber to follow a single circuitous path in such a manner that there is only a single outlet path from the chamber so that the flow stream is not split. An additional important part of the outlet structure includes an elongated outlet tube extending from the end of the passage means. This tube includes a bend to provide a certain resistance to foam emerging from the end of the tube.

The foregoing baffle and tube structure is such that a major portion of expansion of the foam takes place before the foam issues from the outlet tube so that very little additional expansion occurs after the foam has been deposited in a mold. The baffle structure itself includes novel inlet and outlet openings to define a single flow path, the openings being properly dimensioned to enable very easy flushing of the outlet structure so that cleaning of the head assembly may readily be carried out.

A better understanding of the invention will be had by now referring to one embodiment thereof as illustrated in the accompanying draws, in which.

Figure 1:
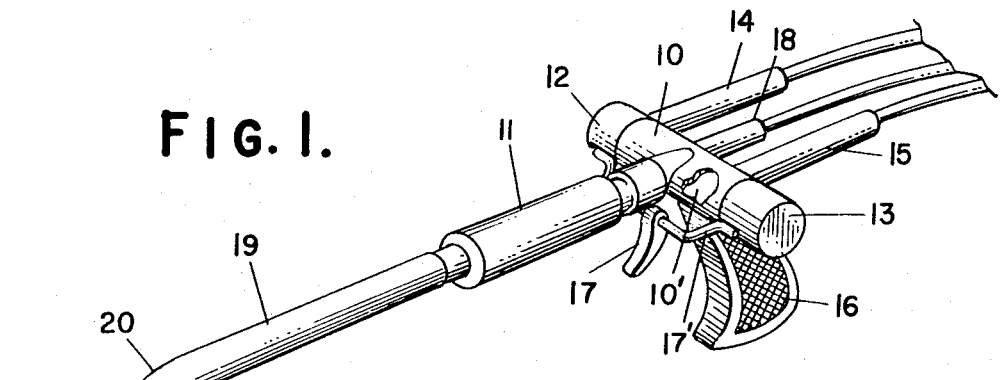
FIGURE 1 is a perspective view partly broken away, of the improved mixing head of this invention.

Referring first to FIGURE 1, the mixing head includes a body member 10 and outlet structure 11. As shown, there are provided first and second valve means 12 and 13 arranged to place first and second inlet lines 14 and 15 in communication with an interior chamber 10' in the body 10.

The body may include a pistol grip 16 together with a suitable trigger mechanism 17 for operating the valve means 12 and 13. A flushing line 18 also communicates with the interior of the body 10 for passing flushing material through the mixing head. The valve means may comprise simple valve heads and valve seats such that pulling on the trigger 17 simultaneously lifts both valve heads through a linkage 17'.

The outlet structure for the mixing head also includes an elongated outlet tube 19 having a bent portion as at 20 and outlet end 21 so that foam emerging from the outlet 21 will experience a given resistance. This given resistance provides a certain amount of control over the outlet pressure and insures that a desired degree of pre-expansion will take place prior to the foam issuing from the outlet end 21.

Figure 2:
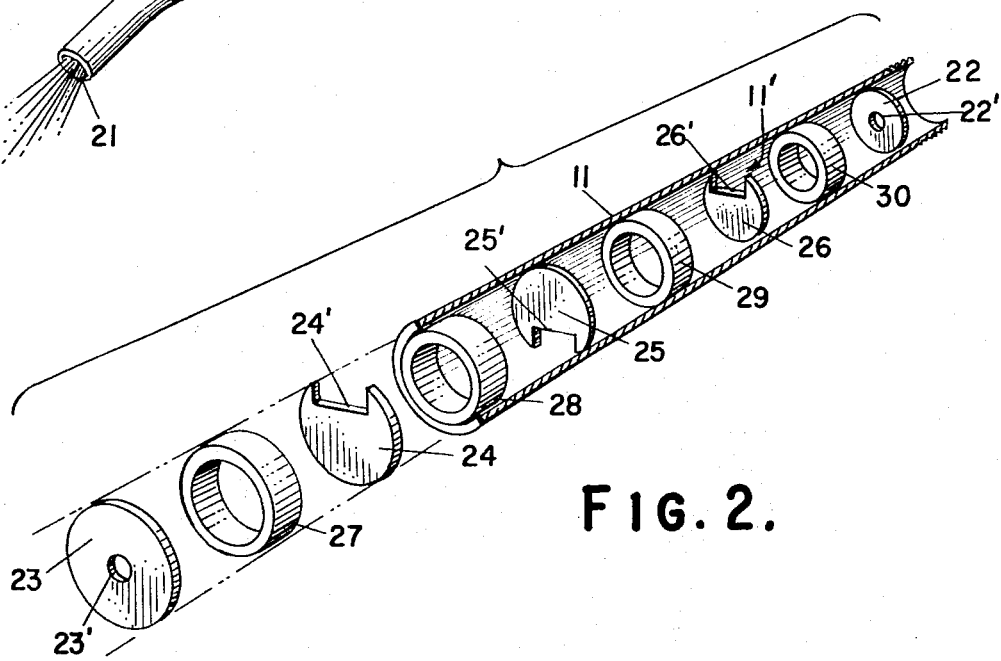
FIGURE 2 is a fragmentary exploded perspective view of a portion of the structure illustrated in FIGURE 1; and, FIGURE 3 is a cross section of a portion of the mixing head in assembled condition.

Referring now to FIGURE 2, details of the outlet structure portion 11 are illustrated. As shown, the structure 11 defines an interior passage 11′ incorporating a baffle means. This baffle means includes an inlet disc 22 provided with a single inlet opening 22′ in communication with the chamber 10′. The cross sectional area of the inlet opening 22′ is preferably less than the cross-sectional area of the passage 11′ and the opening itself is centrally located to direct the stream initially in an axial direction. This dimensioning and location of the opening constitutes an important feature of this invention. The elongated passage 11′ terminates at its other end in a second disc 23 having a single centrally located outlet opening 23′ therein. This outlet opening is also of smaller cross sectional area than the cross sectional area of the passage 11′.

Disposed between the inlet and outlet discs 22 and 23 there is provided a baffle means including a plurality of disc elements such as indicated at 24, 25, and 26 together with a plurality of spacing rings such as indicated at 27, 28, and 29. Only a few discs and rings are illustrated. In an actual embodiment, there would be provided ten to twenty such discs and rings. As shown, the discs are alternately disposed with the rings therebetween to serve as spacing means for distributing the discs along the internal passage in the structure 11 at given intervals. The spacing between the discs is preferably equal approximately to the radius of the passage 11′. Also, these rings position the discs with their planes normal to the axis of the elongated passage 11′.

As shown, each of the discs includes a cut-out portion adjacent a periphery thereof. The cut-outs for the various discs illustrated are indicated at 24′, 25′, and 26′ respectively. Alternate discs have their cut-outs in a given orientation such as the discs 24 and 26 wherein the cut-out portion is facing upwardly. The remaining discs have their cut-outs such as 25′ oriented approximately 180° from the first-mentioned orientation.

Figure 3:
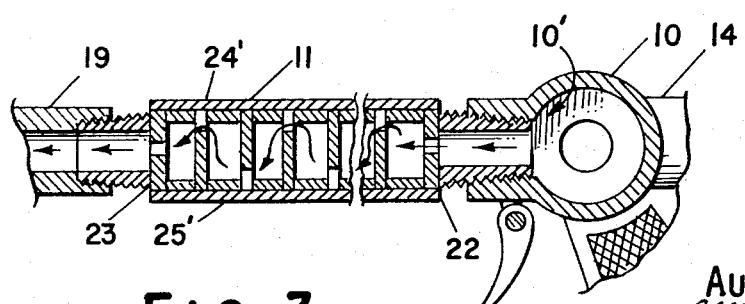

With reference to FIGURE 3, it will be evident that when the various discs and rings are assembled within the passage 11′, foam from the interior chamber of the body 10 is constrained to follow a single circuitous path through the outlet structure as indicated by the arrows.

In operation, foam ingredients are introduced through the first and second inlet lines 14 and 15. For example TDI or toluene di-isocyanate together with Freon 11 and Freon 12 is introduced into the inlet 14. A suitable resin material is introduced into the inlet 15. This resin material also incorporates Freon 12. A proper ratio is maintained between the inflowing materials in the lines 14 and 15 respectively and this ratio may be controlled by suitable flow control means such as described and claimed in my above-referred-to co-pending patent application. The flow control means may be incorporated in the valve means 12 and 13 as a part of the "gun" structure, if desired.

When the foam materials commingle in the chamber, the relatively larger space into which they issue results in a pressure drop so that the Freon 12 rapidly vaporizes thereby "fluffing" the ingredients and mixing them together to start a pre-expansion of the foam. The continual flow of the components into the chamber forces the material through the small inlet opening 22′ as indicated by the arrows in FIGURE 3 and along the circuitous path defined by the cut-out portions in the various disc elements. As a consequence of the flow along the single outlet flow path wherein the stream is not split, as would be the case were multiple outlet or screen type openings provided, it is found that an excellent end product foam is produced. The mixing as a consequence of the circuitous passage is such that desired pre-expansion has time to take place. Provision of the Freon 12 in each of the ingredients effects the proper mixing action without any mechanical agitation nor the introduction of any auxiliary source of compressed gas to foam or froth the material.

As the foam passes through the baffle structure and out the opening 23′, it will flow down the tube 19 and encounter the small bend 20 described in conjunction with FIGURE 1. There will be provided a slight backward resistance as a consequence of this bend which provides a further degree of control over the pre-expansion. Essentially, the outlet tube 19 with its bent portion functions as a pressure reducer effecting a slight pressure drop between the outlet of the baffle and the extreme end 21 of the outlet tube.

After a given foaming operation has been completed, the inlet valves 12 and 13 are closed and a flushing material is passed through the line 18 of FIGURE 1. This flushing material will thoroughly clean the interior central chamber 10′ in the body 10 and will pass through the baffle structure and elongated tube at the end thereof. Since the beginning and ends of the baffle structure have only single small openings 22′ and 23′ respectively, the flushing material is forced through these openings which will insure that clear passages are provided. With multiple type openings, there is a tendency for the flushing material to clog the openings. Thus the feature of only a single outlet flow path is important for proper cleaning as well as proper foam generation.

The unique baffle defined by the discs and rings provides a structure which is extremely simple to disassemble and clean. The cut-outs in the discs are preferably formed from straight lines so as to be somewhat rectangular in shape, the top portions being bounded by the inner circular periphery of the elongated passage 11′. It is found that sharp rectangular openings in the disc elements positioned off center in an alternate manner as described provides a desirable turbulence resulting in a mixing action far superior to any that has heretofore been achieved. The outlet foam is of extremely high quality and as a consequence of the structure together with the elongated outlet tube, the proper pre-expansion can be controlled to the end that high quality control over the density and final foam setting between molds is realizable.

What is claimed is:

1. A foam mixing head comprising, in combination: a body member having a chamber; first and second inlet means; valve means for placing said inlet means into communication with said chamber to pass foam ingredients to be mixed together into said chamber; and an outlet baffle structure including a single elongated passage having at one end a single inlet opening communicating with said chamber and a single outlet opening at its other end; and baffle means disposed in said passage between said inlet and outlet openings, said baffle means comprising a plurality of disc elements and a plurality of spacing rings alternately positioned between said disc elements to hold said disc elements in positions normal to the axis of said passage at given intervals along said passage, each of said disc elements having a circumferential cut-out portion over a given arcuate distance less than 180°, alternate ones of said disc elements being positioned with their cut-outs in a first given orientation, the remaining ones of said disc elements being positioned with their cut-outs circumferentially displaced approximately 180° from said first given orientation to cause foam from said chamber to follow a circuitous path through said passage.

2. A mixing head according to claim 1, including an elongated outlet tube connected to said other end of said passage, said outlet tube having a bend to provide a given resistance to foam emerging from said outlet tube.

3. A foam mixing head according to claim 1 in which each of said cut-outs is bounded by three straight edges and a curved line defined by the inner periphery of said passage.

4. A foam mixing head according to claim 1, in which the spacing between said discs is approximately equal to the radius of said passage.

References Cited

UNITED STATES PATENTS

| 2,645,463 | 7/1953 | Stearns | 259—4 |
| 2,890,868 | 6/1959 | Potchen | 259—4 |
| 2,957,203 | 10/1960 | Marshall | 259—7 X |
| 2,973,000 | 2/1961 | Pearson | 259—4 X |
| 3,157,361 | 11/1964 | Heard | 259—4 X |

FOREIGN PATENTS 36,917  11/1935  Netherlands.

WALTER A. SCHEEL, *Primary Examiner.*

J. M. BELL, *Assistant Examiner.*